United States Patent [19]
Gadbois

[11] 3,975,856
[45] Aug. 24, 1976

[54] RELEASABLE FISHING HOOK

[76] Inventor: Robert H. Gadbois, 6202 Darnell, Houston, Tex. 77036

[22] Filed: Mar. 26, 1975

[21] Appl. No.: 562,025

[52] U.S. Cl. .................................................. 43/36
[51] Int. Cl.² ........................................ A01K 83/02
[58] Field of Search ........................................ 43/36

[56] References Cited
UNITED STATES PATENTS

| 243,622 | 6/1881 | Rentz et al............................. 43/36 |
| 814,624 | 3/1906 | Robinson................................ 43/36 |
| 2,004,316 | 6/1935 | Foote..................................... 43/36 |
| 2,284,034 | 5/1942 | Binkowski.............................. 43/36 |
| 2,449,045 | 9/1948 | Athans.................................... 43/36 |
| 2,479,484 | 8/1949 | Fornas................................... 43/36 |
| 3,492,752 | 2/1970 | Viveiros................................. 43/36 |

Primary Examiner—Warner H. Camp
Attorney, Agent, or Firm—Pravel & Wilson

[57] ABSTRACT

A releasable fishing hook includes first and second integrally connected shank members which terminate in hook portions, the shank members being held in a closed position by a geniculated locking segment on each shank member which frictionally interlock but are releasable to allow the shank members to move to an open or outward position in response to contact with a fish or the like.

2 Claims, 4 Drawing Figures

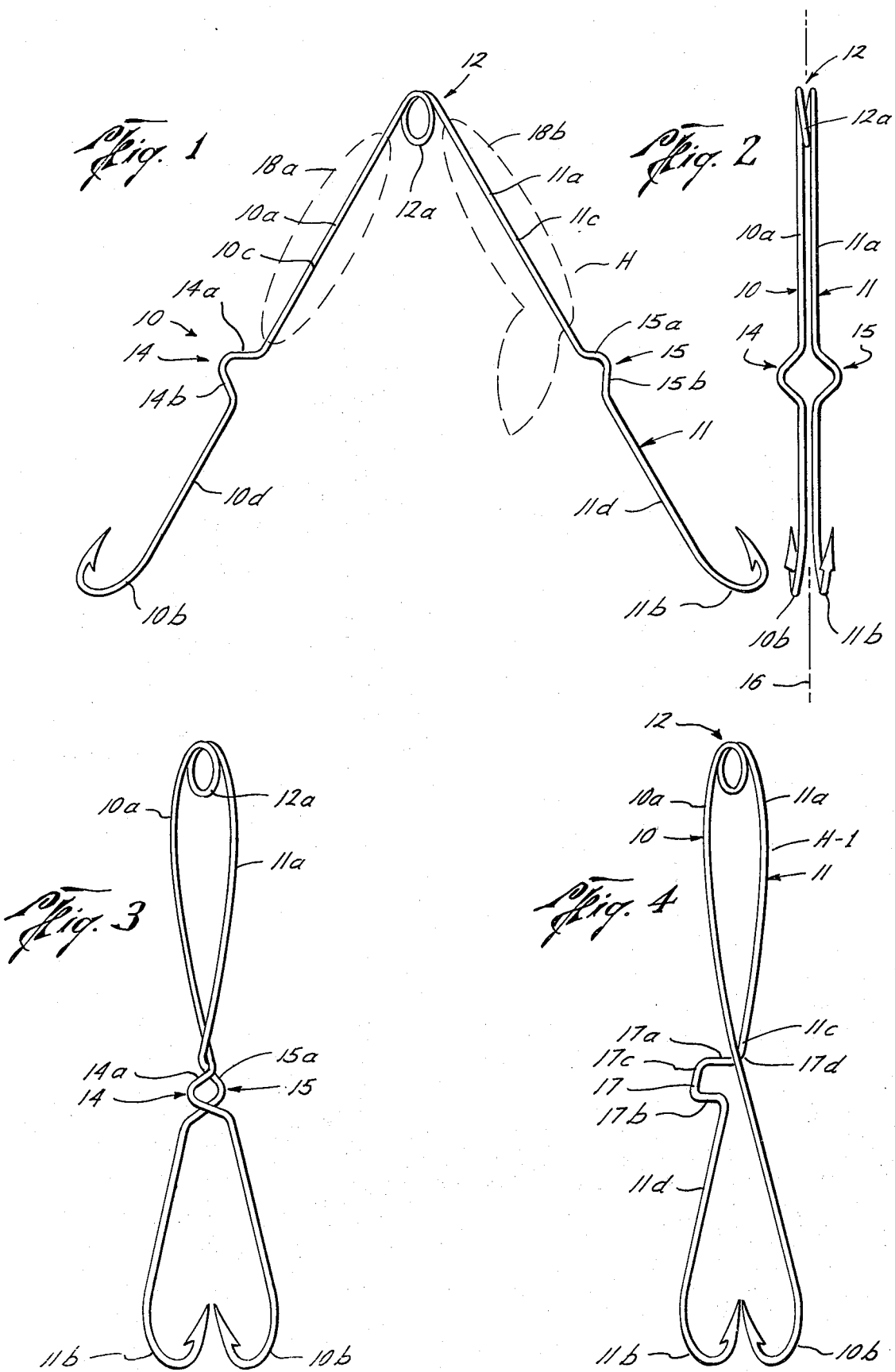

RELEASABLE FISHING HOOK

BACKGROUND OF THE INVENTION

The field of this invention is fishing apparatus. The never ending quest for a releasable fishing hook began well over a century ago. U.S. Pat. No. 44,368 issued to Gardiner, discloses a releasable fishing hook which includes two hook members that spring outwardly in response to a fish pulling on the closed hooks. In Gardiner a center pin slidably extends through eyes mounted on each of the hook members in order to hold the releasable hook in the closed position. There are numerous other releasable hooks which are based upon the same broad concept. U.S. Pat. No. 51,651, issued to Davis & Johnson, utilized a slidable, center pin having a curved tip which loops about releasable hook members in order to temporarily hold the hook members in a closed position. U.S. Pat. No. 69,221 of Kidder also uses a center, slidable pin that is connected by means of a clasp and eye connection to two integrally connected hook members for the purpose of spreading the hook members apart in response to pull by a fish. U.S. Pat. No. 157,480 of Perry utilizes a trigger plate to hold integrally connected hook members in a releasable, closed position. U.S. Pat. No. 243,622 of Rentz & Herzog uses a separate piece of spring wire mounted on one of two integrally connected book members to hold the hook members in a closed position by releasably extending through overlapping bent portions in the hook members. The bent portion of the hook members are described as V-shaped opposite vertical bends which are positioned in substantially the same plane such that the bent portions do not contact each other but rather overlap in the closed position to receive the spring wire holder. U.S. Pat. No. 264,256, issued to De Forest, utilizes a pin-type pivotal connection to pivot two connected hooks outwardly in response to a pull on either the fish line or by the fish. U.S. Pat. No. 373,991 of Lockhead utilizes a lock ring which is positionable in notches mounted on integrally joined hook members in order to hold the hook members in a releasable, closed position. U.S. Pat. No. 456,776, issued to Prior, utilizes a separate catch mounted on one of two integrally connected hook members to releasably hold the two hook members in a closed position. U.S. Pat. No. 575,405, issued to Punches, discloses two integrally connected hook members formed from a single piece of wire, the hook members being interlockable to frictionally hold each other in a closed position until contacted by a fish. Finally, U.S. Pat. Nos. 3,727,340 of Harris and 3,751,844 of Rossnan disclose two very recent releasable hook inventions utilizing more complicated springs arrangements to provide releasable hooks.

The large number of patents and the relative periods of development certainly indicate that, although the concept of providing a releasable fishing hook is well known, an actual, successful embodiment of such a hook has been somewhat illusive, and the trend in the recent patents has been towards more complicated arrangements for releasable hooks.

SUMMARY OF THE INVENTION

It is the object of this invention to provide a new and improved releasable fishing hook which may be made from a single piece of wire and which does not require a separate connecting member or piece to actually hold the hooks in a closed position. The new and improved fishing hook of the preferred embodiment of this invention includes first and second shank members which are yieldably connected at one end by a yieldable connection means which may be integral with the shank members themselves. The yieldable connection means continuously urges the first and second shank members from a closed position outwardly toward an open position. The first and second shank members have mounted thereon or integrally formed therewith one or more fish hooks. Each of the shank members includes a geniculated, locking segment. The locking segments can be overlapped and temporarily locked in frictional engagement in order to hold the first and second shank members and hooks mounted thereon in a closed position until contacted by a fish or the like, whereupon the frictional engagement of the overlapping locking segments is overcome and the first and second shank members are moved outwardly to an open position in order to better catch the fish.

In the preferred embodiment of this invention, the locking segments extend outwardly from the plane of movement of the first and second shank members in order to frictionally engage each other and hold the shank members in a closed position without the need for an additional holding member or piece.

In a second embodiment of this invention, a releasable fishing hook is provided which includes first and second shank members wherein one of the shank members includes a geniculated locking segment having an upper, bent portion which extends perpendicularly from the shank member in order to frictionally engage the other shank member and hold the shank members and the hooks mounted thereon in a closed position.

BRIEF DESCRIPTION OF THE DRAWINGS

FIG. 1 is a side view of the releasable fishing hook of the preferred embodiment of this invention in an open position wherein the approximate plane of movement for the yieldably connected hook members is approximately thirty degrees with respect to the plane of the drawing;

FIG. 2 is an end view of the releasable fishing hook of the preferred embodiment of this invention in an open position wherein the approximate plane of movement of the hook members is perpendicular to the plane of the drawing;

FIG. 3 is a side view at an angle similar to FIG. 1 illustrating the releasable hook of this invention in a closed position; and FIG. 4 is a side view taken at an angle similar to FIG. 1 of a second embodiment of the releasable fishing hook of this invention.

DESCRIPTION OF THE PREFERRED EMBODIMENT

Referring to the drawing, the letter H generally designates the new and improved fishing hook of the preferred embodiment of this invention. The fishing hook H includes a first hook member 10 which is joined to a second hook member 11 by a yieldable, flexible connection generally designated as 12. In the embodiment illustrated, the entire releasable fishing hook H is formed of a single piece of wire; therefore the yieldable connection 12 is formed by coiling the single piece of wire at least one turn 12a in order to form a coil spring-type connection between the first and second hook members 10 and 11, respectively. The single piece of wire is very resilient so that the coiled connection 12 urges the first and second hook members 10 and 11 outwardly away from each towards an open position illustrated in FIG. 1. It should be understood that another type of yieldable connection 12 may be utilized in place of the single piece, coil connection just described, so long as the hook members 10 and 11 are urged from the closed position of FIG. 3 to the open position of FIGS. 1 and 2.

The hook member 10 basically includes a shank member 10a which terminates in a hook portion 10b. In the embodiment of the invention illustrated in the drawing, the hook portion 10b if formed integrally with the shank member 10a. However, it should be understood that the hook portion 10b can be formed separately from the hook portion 10a and attached thereto by any suitable means. The shank member 10a further includes a geniculated locking segment 14 which joins upper shank portion 10c and lower shank portion 10d of the shank member 10a.

The hook member 11 also includes a shank portion 11a which terminates in a hook portion 11b which is formed integrally therewith. The hook portions 10b and 11b are only single hooks in the embodiment of the invention illustrated in the drawing; however, it should be understood that it is within the scope of this invention to use multiple hooks on either or both of the shanks 10a and 11a.

The shank member 11a further includes a geniculated locking segment 15 which joins upper shank portion 11c and lower shank portion 11d of this shank member 11a. The locking segment 15 is alignable with the locking segment 14 so that the locking segments 14 and 15 can be positioned in frictional engagement with each other in order to hold the hook members 10 and 11 in the closed position illustrated in FIG. 3.

Referring in particular to FIG. 2, which is an end view of the releasable hook in an open position, the movement of the hook members 10 and 11 may be described as being in an approximate plane designated by the number 16 and indicated by scored lines. This approximate plane of movement 16 for the hook members 10 and 11 during movement between the open position of FIGS. 1 and 2 and the closed position of FIG. 3, will be utilized as a reference plane for the purposes of describing the orientation of the locking segments 14 and 15, which is critical to this invention.

The locking segments 14 and 15 have been described as being geniculated in configuration. The configuration of the locking segments 14 and 15 may also be described as being V-shaped and may further be described as forming a bend or elbow in their respective shank members 10a and 11a. It may also be U-shaped as illustrated in FIG. 4, which will be described in detail later.

The locking segment 14 includes an upper bent portion 14a which is formed at an acute angle with respect to the upper shank portion 10c of the shank member 10a. The locking segment 14 further includes a lower bent portion 14b which is at an acute angle with respect to the lower shank portion 10d of the shank member 10a. The upper and lower shank portions 14a and 14b are substantially perpendicular with respect to each other thereby forming a V-shaped notch or crook in the shank member 10a. The plane formed by the bent portions 14a and 14b is substantially perpendicular to the plane of movement 16 of the hook members 10 and 11.

Similarly, the locking segment 15 includes an upper bent portion 15a joined to a lower bent portion 15b. The upper bent portion 15a is integrally joined to upper shank portion 11c of the shank member 11a; and, lower bent portion 15b is integrally formed with lower shank portion 11d of the shank member 11a. The upper and lower bent portions 15a and 15b are substantially perpendicular with respect to each other thereby forming a V-shaped bend or crook. The plane defined by the upper and lower bent portions 15a and 15b is substantially perpendicular to the plane 16 of movement of the hook members 10 and 11 as illustrated in FIG. 2. It is also within the scope of this invention to position the planes for the locking segment bent portions such as 15a and 15b at other acute angles with respect to the plane 16. It is not within the scope of this invention to position both of the locking segments 14 and 15 in the plane 16 or otherwise position the locking segments 14 and 15 so that they do not frictionally engage each other.

The locking segments 14 and 15 on the hook members 10 and 11, respectively, are aligned to be positioned adjacent to each other and in frictional engagement with each other in order to temporarily hold the hook members 10 and 11 in the closed position until contacted by a fish or the like. Referring in particular to FIG. 3, the frictional connection formed by the locking segments 14 and 15 is actually a frictional connection of the upper bent portions 14a and 15a. The acute angle of the upper bent portions 14a and 15a of the locking segments 14 and 15, respectively, may be varied in order to vary the degree of frictional engagement and thus vary the amount of force necessary to release the frictional connection of the upper bent portions 14a and 15a.

Referring to FIG. 4, a second embodiment H-1 of the releasable hook of the preferred embodiment of this invention is illustrated; and, like numbers and letters will be utilized to describe similar structure wherever possible. In FIG. 4, the hook member 10 is again connected to a hook member 11 by an integral coil-type connection 12. Again, the hook member 10 includes a shank member 10a and the hook member 11 includes a shank member 11a. The shank member 10a terminates in hook portion 10b and the shank member 11a terminates in hook portion 11b. However, in this embodiment, the shank portion 10a is approximately straight and does not contain any type of locking segment. The shank portion 11 does contain a locking segment 17 which is U-shaped. The locking segment 17 includes an upper bend portion 17a which is oriented approximately perpendicular to upper portion 11c of the shank member 11a. Further, the locking segment 17 includes a lower bent portion 17b positioned at a right angle with respect to lower shank portion 11d of the shank member 11a and the upper and lower bent portions 17a and 17b are joined by intermediate portion 17c. Of course, in the embodiment of the invention illustrated, the entire releasable hook H-1 is formed of a single piece of wire and therefore the various bent portions are actually integrally connected to each other. The bent portions 17a, 17b and 17c cooperate to provide a U-shaped locking element or segment which is adapted to receive along the upper bent portion 17a the substantially straight shank member 10a. In the embodiment illustrated, the shank member 10a actually rests in the corner 17d formed by the intersection of the upper bent portion 17a and the upper shank portion 11c. The locking segment 17 serves to hold the hook members 10 and 11 in a closed position until acted upon by a fish or the like which applies an external force that overcomes the frictional engagement between the upper bent portion 17a and the shank member 10a thereby allowing the yieldable coil connection 12 to spring the hook members 10 and 11 outwardly to an open position and more effectively hook the fish.

Referring again to FIG. 1, one or more lure members such as 18a and 18b may be mounted onto the shank members 10a and 11a, respectively, in order to provide an effective lure when the hook members 10 and 11 are in the closed position. It is within the scope of this invention to utilize either or both of the shank members 10a and 11a to receive lure members such as 18a and 18b, respectively. The lure pieces 18a and 18b may be formed of a suitable, moldable material such as a thermoplastic or thermosetting synthetic resin and may actually be molded as a one-piece unit while the hook members 10 and 11 are in a closed position. Then, the lure pieces 11a and 11b may be formed by cutting the single, molded lure member into. Of course, it is within the scope of this invention to utilize other methods of attaching the lure members 18a and 18b onto the hook members 10 and 11.

The foregoing disclosure and description of the invention are illustrative and explanatory thereof, and various changes in the size, shape and materials as well as in the details of the illustrated construction may be made without departing from the spirit of the invention.

For example, the embodiments illustrated herein have been described as being formed of single pieces of wire or the like. It is within the scope of this invention to also form the entire releasable hook H and H-1 out of separate elements which are suitably connected together. Further, the hook portions 10b and 11b have been illustrated as being in substantial horizontal alignment when the hook member 10 and 11 are in the closed position. It is further within the scope of this invention to utilize shank members 10a and 11a of different lengths such that the hook portions 10b and 11b will be at different heights. Other similar variations are within the scope of this invention.

I claim:

1. A new and improved releasable fishing hook, comprising:

first and second shank members yieldably connected together at one end by a yieldable connection means continuously urging said first and second shank members from a closed position away from each other to an open position, said first and second shank members moving between said open and closed positions in an approximate plane or path;

each of said first and second shank members terminating in a hook at the other end thereof;

each of said first and second shank members having a geniculated locking segment, said first shank member locking segment overlapping and frictionally engaging said second shank member locking segment in order to temporarily hold said first and second shank members in said closed position whereby external contact by a fish or the like will release said frictional engagement of said shank member geniculated segments such that said first and second shank members and hooks thereon spring outwardly to an open position to more securely hook a fish or the like;

said first and second locking segments being integrally formed with said first and second shank members and extended outwardly in opposite directions substantially perpendicular to said approximate plane of movement of said shank members between said closed and open positions;

said first and second shank member locking segments each having upper and lower bent portions which are approximately perpendicular to each other, said upper bent portions of each of said first and second shank member locking segments being disposed at an acute angle with respect to said shank member formed therewith;

said first shank member upper bent portion being positioned for frictional engagement with said second shank member upper bent portion in order to temporarily hold said first and said second shank members in said closed position until released by agitation from a fish; and said first shank member having a first lure portion mounted thereon and said second shank member having a second lure portion mounted thereon, said first and second lure portions having mating surfaces positioned adjacent to each other with said shank members in said closed position, said first lure portion cooperating with said second lure portion to form the appearance of a substantially unitary lure for the purpose of attracting a fish.

2. A method of mounting a lure onto a releasable hook wherein the releasable hook includes yieldably connected hook members which may be releasably held in a closed position and are movable outwardly upon contact by a fish or the like, comprising the steps of:

molding a single lure piece onto the hook members while maintaining the hook members in a closed position; and separating the lure piece into two separate pieces, one piece mounted on each of the hook members whereby the separated pieces have the appearance of a single lure when the hook members are in a closed position but allow the hook members to be released and moved to an open position in order to more securely hook a fish.

* * * * *